(12) United States Patent
Li et al.

(10) Patent No.: US 9,459,739 B2
(45) Date of Patent: Oct. 4, 2016

(54) INDUCTION UNIT, TOUCH DETECTING ASSEMBLY AND TOUCH SENSITIVE DEVICE

(75) Inventors: Zhengang Li, Shenzhen (CN); Chen Huang, Shenzhen (CN); Yun Yang, Shenzhen (CN)

(73) Assignees: SHENZHEN BYD AUTO R&D COMPANY LIMITED (CN); BYD COMPANY LIMITED (CN)

( * ) Notice: Subject to any disclaimer, the term of this patent is extended or adjusted under 35 U.S.C. 154(b) by 102 days.

(21) Appl. No.: 14/131,729

(22) PCT Filed: Jul. 26, 2012

(86) PCT No.: PCT/CN2012/079219
§ 371 (c)(1),
(2), (4) Date: Feb. 20, 2014

(87) PCT Pub. No.: WO2013/013633
PCT Pub. Date: Jan. 31, 2013

(65) Prior Publication Data
US 2014/0168159 A1    Jun. 19, 2014

(30) Foreign Application Priority Data

Jul. 26, 2011   (CN) .......................... 2011 1 0210959
Jul. 26, 2011   (CN) .......................... 2011 1 0211018
Jul. 26, 2012   (CN) .......................... 2011 1 0210958

(51) Int. Cl.
G06F 3/041   (2006.01)
G06F 3/044   (2006.01)

(52) U.S. Cl.
CPC ............. *G06F 3/044* (2013.01); *G06F 3/0416* (2013.01)

(58) Field of Classification Search
CPC ................. G06F 3/03547–3/047; G09G 3/30; G09G 3/36; G09G 5/00; G09G 5/10; G09G 5/02

USPC ................................................... 345/173–178
See application file for complete search history.

(56) References Cited

U.S. PATENT DOCUMENTS

| | | | |
|---|---|---|---|
| 6,466,036 B1 | 10/2002 | Philipp | |
| 2006/0267959 A1* | 11/2006 | Goto ................. | G01C 21/3664 345/173 |
| 2010/0091231 A1 | 4/2010 | Nishimura et al. | |
| 2010/0182275 A1 | 7/2010 | Saitou | |
| 2011/0043464 A1 | 2/2011 | Lee et al. | |

(Continued)

FOREIGN PATENT DOCUMENTS

| | | |
|---|---|---|
| CN | 1708672 A | 12/2005 |
| CN | 101174511 A | 5/2008 |

(Continued)

OTHER PUBLICATIONS

International Search Report for PCT/CN2012/079219.

*Primary Examiner* — Pegeman Karimi
(74) *Attorney, Agent, or Firm* — Troutman Sanders LLP (57) ABSTRACT

An induction unit, a touch detecting assembly, and a touch sensitive device are provided. The touch sensitive device comprises: a substrate (100); a plurality of induction units (200) not intersecting with each other, and a detecting module (300) connected with the first electrodes (210) and the second electrodes (220) respectively. The induction unit (200) comprises a first electrode (210), a second electrode (220), a plurality of first structures (230) and a plurality of second structures (240). The plurality of first structures (230) are connected end to end via the plurality of second structures (240). The detecting module (300) is configured to apply a level signal to the first electrodes (210) and/or the second electrodes (220) to charge a self capacitor, to calculate a ratio between a first resistor and a second resistor, and to determine a touch position in a first direction and a touch position in a second direction.

13 Claims, 4 Drawing Sheets

(56) References Cited

U.S. PATENT DOCUMENTS

2011/0079501 A1    4/2011  Arai
2012/0098790 A1*   4/2012  Han .................. G06F 3/045
                                                        345/174

FOREIGN PATENT DOCUMENTS

| CN | 102081479 A |   | 6/2011 |
| CN | 202422046 U |   | 9/2012 |
| KR | 20110000985 | * | 1/2011 |

\* cited by examiner

INDUCTION UNIT, TOUCH DETECTING ASSEMBLY AND TOUCH SENSITIVE DEVICE

CROSS-REFERENCE TO RELATED APPLICATIONS

This application claims priority to and benefits of the following applications:

1) Chinese Patent Application Serial No. 201110211018.2, filed with the State Intellectual Property Office of P. R. China on Jul. 26, 2011;
2) Chinese Patent Application Serial No. 201110210959.4, filed with the State Intellectual Property Office of P. R. China on Jul. 26, 2011; and
3) Chinese Patent Application Serial No. 201110210958.X, filed with the State Intellectual Property Office of P. R. China on Jul. 26, 2011.

The entire contents of the above applications are incorporated herein by reference.

FIELD

The present disclosure relates to an electronic apparatus design and fabrication field, and more particularly to an induction unit, a touch detecting assembly, and a touch sensitive device.

BACKGROUND

Currently, a touch screen has been spread quickly from being used in a small minority commercial market, such as an ATM (automatic teller machine) in a bank and an industrial control computer to being applied in a mass consumption electronic apparatuses, such as mobile phones, PDA (personal digital assistant), GPS (global positioning system), PMP (such as MP3 or MP4) and panel computers. The touch screen, which has advantages of simple, convenient and humanized touch operations, will be a best human-computer interaction interface and be widely applied in portable apparatus.

Figure 1:
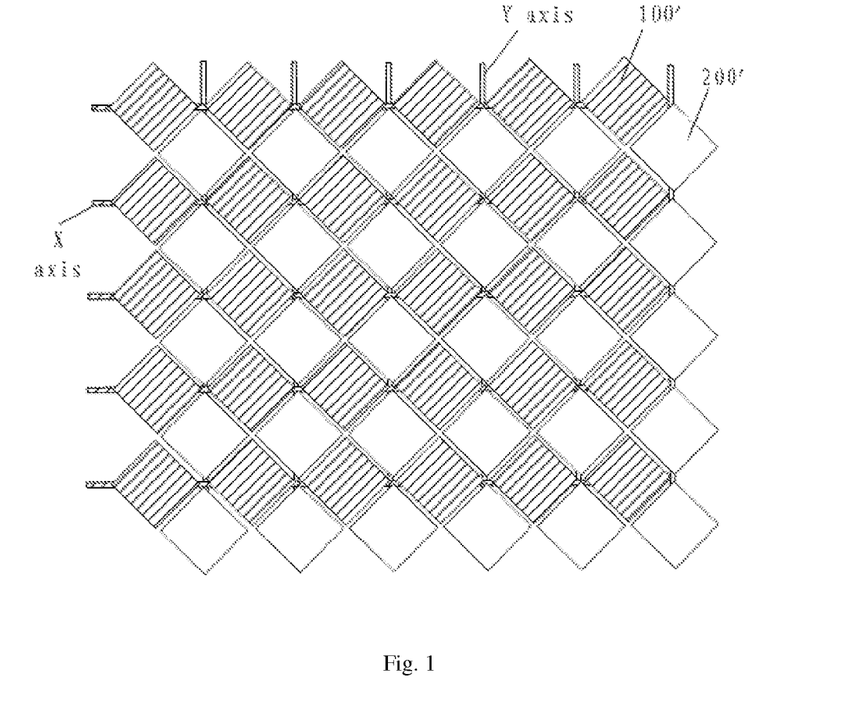
FIG. 1 is a schematic structural view of a conventional self capacitor type touch screen.

A capacitance touch screen is generally divided into two types: self-capacitance type and mutual-capacitance type. FIG. 1 shows a structure of a conventional self-capacitance type touch screen. The self-capacitance type touch screen comprises a plurality of induction units 100' and 200' which have a diamond structure and are located in two different layers. A scanning is performed along an X axis and a Y axis respectively, and if a capacitance variation of a certain intersection point exceeds a predetermined range, the intersection point is made as a touch point. Although a linearity of the self-capacitance type touch screen is good, ghost touch points still appear frequently, and thus it is difficult to realize a multipoint touch. In addition, since a double-layer screen is used, the structure is complicated and the cost is increased. Moreover, under a condition of a slight capacitance variation, the diamond structure may cause a coordinate drift, that is, the diamond structure may be easily affected by an external factor.

Figure 2:
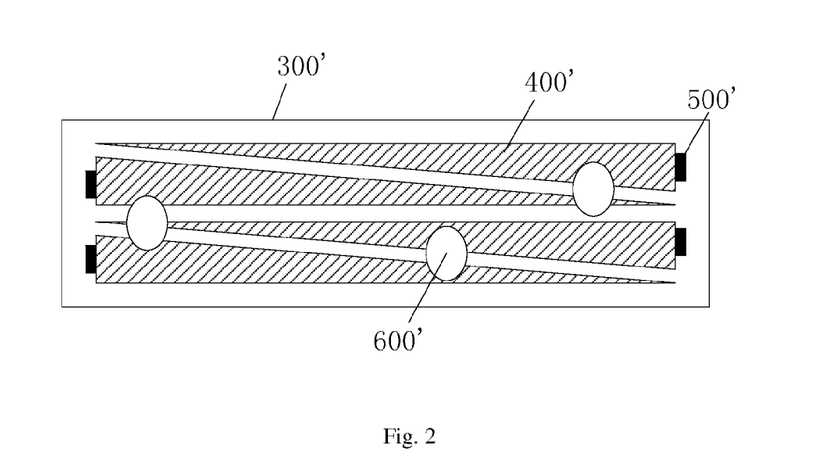
FIG. 2 is a schematic structural view of another conventional self capacitor type touch screen.

FIG. 2 shows a structure of another conventional self-capacitance type touch screen. The self-capacitance type touch screen uses a triangular screen structure. The self-capacitance type touch screen comprises: a substrate 300', a plurality of triangular induction units 400' disposed on the substrate 300', and a plurality of electrodes 500' connected with the triangular induction units 400' respectively. A single-end detection is performed for the conventional triangular induction unit, that is, the detection is performed only from one direction of the induction unit. Although the self-capacitance type touch detecting assembly has a simple structure, an induction capacitance of the screen is not optimized, so that the capacitance variation is small, thus reducing a signal-to-noise ratio. In addition, because each induction unit has a triangular shape, when the figure moves horizontally, the contact area may not increase linearly, thus causing the deviation of the X coordinate and a poor linearity accordingly.

Induction wires of the self-capacitance type touch screen are made into substantially triangular rings from conductive materials. Two adjacent induction wires are disposed opposite to each other. A number of electrodes required in a given region depends on a width of each induction wire and a distance between every two adjacent induction wires. A number of the induction wires may influence a complexity of a relative disposition between the induction wires and an available resolution of a given point. Meanwhile, the available resolution of a given point may also be influenced by a marginal shape of each induction wire. As shown in FIG. 2, since a contact face between a finger 600' and a screen is substantially an ellipse and an influence of a slope on graphic design is taken into account, by analyzing from the viewpoint of physics, when the ellipse moves on the screen, an area of a part of the triangular induction unit 400' covered by the finger 600' may not vary stably linearly. Similarly, an induction capacitance of the part of the triangular induction unit 400' covered by the finger 600' may not vary stably and linearly.

In addition, because the capacitance variation of a conventional capacitance induction unit is small to a femtofarad order of magnitude, a measure circuit needs to satisfy a higher requirement because of an existence of a stray capacitance. Moreover, because the stray capacitance may vary because of many factors, such as temperature, position, and distribution of internal and external electric field, the stray capacitance may interfere with or even bury a tested capacitance signal. In addition, for a single-layer capacitance, because the induction capacitance may be seriously interfered by an influence of a level signal Vcom, which is used for preventing a liquid crystal of a LCD screen from aging.

SUMMARY

Embodiments of the present disclosure seek to solve at least one of the problems existing in the prior art, particularly to solve at least one defects of a conventional self-capacitance type touch screen.

According to a first aspect of the present disclosure, a touch sensitive device is provided. The touch sensitive device comprises: a substrate; a plurality of induction units disposed on the substrate and not intersecting with each other, in which the induction unit comprises a first electrode, a second electrode, a plurality of first structures and a plurality of second structures, the plurality of first structures are connected end to end via the plurality of second structures, the first electrode is connected with one first structure at one end of the induction unit, and the second electrode is connected with another first structure at the other end of the induction unit; and a detecting module connected with the first electrodes and the second electrodes respectively, in which the detecting module is configured to apply a level signal to the first electrodes and/or the second electrodes to charge a self capacitor generated by a touch on an induction unit, to calculate a ratio between a first resistor between a first electrode of at least one induction unit and the self capacitor and a second resistor between a second electrode of the at least one induction unit and the self capacitor when the touch is detected on the at least one induction unit, to determine a touch position in a first direction according to the ratio between the first resistor and the second resistor, and to determine a touch position in a second direction according to a position of the at least one touched induction unit.

According to a second aspect of the present disclosure, an induction unit is provided. The induction unit comprises: a plurality of first structures; a plurality of second structures for connecting the plurality of first structures end to end; a first electrode connected with one first structure at one end of the induction unit; and a second electrode connected with another first structure at the other end of the induction unit, in which the first electrode and the second electrode are connected with corresponding pins of a control chip.

According to a third aspect of the present disclosure, a touch detecting assembly is provided. The touch detecting assembly comprises: a substrate; and a plurality of induction units disposed on the substrate and not intersecting with each other, in which the induction unit comprises a first electrode, a second electrode, a plurality of first structures, and a plurality of second structures, the plurality of first structures are connected end to end via the plurality of second structures, the first electrode is connected with one first structure at one end of the induction unit, the second electrode is connected with another first structure at the other end of the induction unit, and each first electrode and each second electrode are connected with corresponding pins of a control chip.

According to a fourth aspect of the present disclosure, a touch sensitive device is provided. The touch sensitive device comprises: a touch detecting assembly according to the third aspect of the present disclosure; a control chip, in which the first electrodes and the second electrodes of the plurality of induction units are connected with corresponding pins of the control chip, and the control chip is configured to apply a level signal to each first electrode and/or each second electrode to charge a self capacitor generated by a touch on an induction unit, and to calculate a ratio between a first resistor between a first electrode of at least one induction unit and the self capacitor and a second resistor between a second electrode of the at least one induction unit and the self capacitor when the touch is detected on the at least one induction unit; and a host computer, configured to receive the ratio between the first resistor and the second resistor sent from the control chip, to determine a touch position in a first direction according to the ratio between the first resistor and the second resistor, and to determine a touch position in a second direction according to a position of the at least one touched induction unit.

According to an embodiment of the present discourse, level signals are applied to electrodes of the induction unit at both ends of the induction unit. A self capacitor may be generated when the induction unit is touched. Therefore, the self capacitor may be charged by the applied level signals and a touch position may be determined according to a ratio between the first resistor and the second resistor. For example, in one embodiment, the ratio between the first resistor and the second resistor is calculated by a ratio between a first detecting value and a second detecting value obtained by detecting from the first electrode and/or the second electrode when the self capacitor is charged/discharged. Therefore, the first detecting value and the second detecting value may be detected from the first electrode and/or the second electrode when the self capacitor is charged or discharged. Thus, the first detecting value and the second detecting value may reflect the touch position on the induction unit, and the touch position on the induction unit may be further determined.

The touch sensitive device according to an embodiment of the present disclosure adopts a novel self capacitor detecting method. When the induction unit is touched, a self capacitor is generated at the touch position on the touch sensitive device, and the touch position may divide the induction unit into two resistors. When the self capacitor detection is performed, the touch position on the induction unit may be determined by taking into account the two resistors. The touch sensitive device according to an embodiment of the present disclosure is simple in structure. Moreover, for one induction unit, the charge or discharge may be performed from the first electrode and/or the second electrode of the one induction unit, which may not only reduce a RC constant, save time and improve an efficiency, but also ensure that a coordinate may not drift. In addition, with the touch sensitive device according to an embodiment of the present disclosure, the signal-to-noise ratio of a circuit may be effectively increased, the noise of the circuit may be reduced, and a linearity of an induction may be improved.

The touch sensitive device according to an embodiment of the present disclosure may not be influenced by a mutual capacitor and water. Since there is a coupling capacitor between the screen and the induction unit and a level signal Vcom is continuously reversed, which is equivalent to applying a continuously reversed voltage to one end of the coupling capacitor, a voltage at the other end of the coupling capacitor may vibrate violently, thus badly influencing a variation of a capacitor between the induction unit and the ground. When the induction unit is touched, since a current may be generated by the applied voltage in the induction unit, which is equivalent to applying a constant voltage to the other end of the coupling capacitor, even if Vcom is continuously reversed, the voltage at the other end of the coupling capacitor may change slightly. Accordingly, a screen shielding layer and related procedures thereof may be eliminated, thus further reducing a cost while enhancing an anti-interference capability. Furthermore, with the induction unit according to an embodiment of the present disclosure, the noise may be reduced, and the linearity of the induction may be improved.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Figure 3:
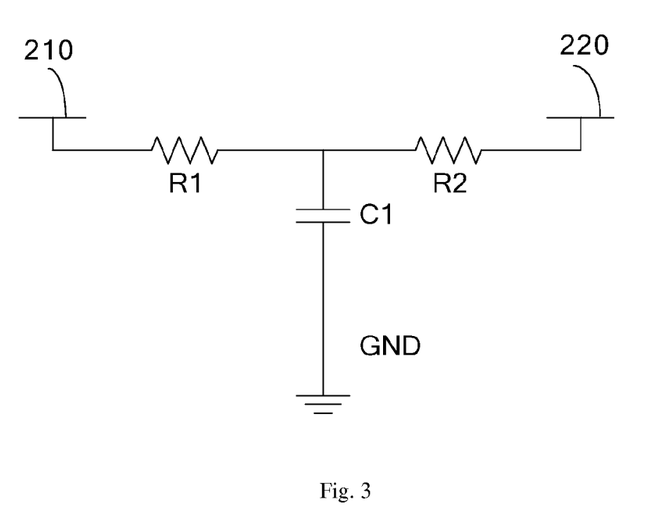
FIG. 3 is a diagram showing a detecting principle of a touch sensitive device according to an embodiment of the present disclosure.

An embodiment of the present disclosure adopts a novel self capacitor detecting method. When an induction unit is touched, a touch position may divide the induction unit into two resistors. When the self capacitor detection is performed, the touch position on the induction unit may be determined by taking into account the two resistors. FIG. 3 is a diagram showing a detecting principle of a touch sensitive device according to an embodiment of the present disclosure. When a finger touches the induction unit, the induction unit is divided into the first resistor R1 and the second resistor R2 and a ratio between R1 and R2 is related to the touch position. For example, as shown in FIG. 3, when the touch position is closer to the first electrode 210, the first resistor R1 is comparatively small and the second resistor R2 is comparatively large; in contrast, when the touch position is closer to the second electrode 220, the first resistor R1 is comparatively large and the second resistor R2 is comparatively small. Therefore, by detecting the first resistor R1 and the second resistor R2, the touch position on the induction unit may be determined.

In the embodiments of the present disclosure, the first resistor R1 and the second resistor R2 may be determined in various ways, for example, by detecting one or more of a current detecting value from a first electrode and a second electrode, a self capacitor detecting value, a level signal detecting value and a charge variation, and thus the first resistor R1 and the second resistor R2 may be obtained based on the above detecting values. In addition, in the embodiments of the present disclosure, the above detecting values may be detected when the self capacitor is charged (i.e., obtaining the first charge detecting value and the second charge detecting value), or may be detected when the self capacitor is discharged (i.e., obtaining the first discharge detecting value and the second discharge detecting value). In addition, various ways may be adopted to perform the detection during the charge or discharge period.

It should be noted that at least one of the charge and discharge is performed from the first electrode 210 and the second electrode 220 so as to obtain two detecting values reflecting a difference between the first resistor R1 and the second resistor R2, i.e., the first detecting value and the second detecting value. That is, during charge or discharge period, there is a current flowing through the first resistor R1 and the second resistor R2 so that the first detecting value and the second detecting value detected may reflect the difference between the first resistor R1 and the second resistor R2.

In the embodiments of the present disclosure, the charge and the detection are generally needed to be performed twice, and the charge comprises the charge from the first electrode 210 and the second electrode 220 simultaneously. In some embodiments, discharge may be performed twice. For convenience, the charge and the detection are each performed twice in the following embodiments. It should be noted that performing charge and detection twice is only an example with a comparatively simple algorithm for realizing the embodiments. However, those skilled in the art may increase a number of times of charge and detection, for example, the charge and the detection may be performed three times, then the first resistor R1 is calculated according to the first time charge detecting value and the second time charge detecting value, and the second resistor R2 is calculated according to the first time charge detecting value and the third time charge detecting value.

Specifically, according to the embodiments of the present disclosure, the detecting methods comprise, but are not limited to, the following methods.

1. Firstly, the first electrode 210 and the second electrode 220 of the induction unit are applied with level signals to charge the self capacitor (generated when the induction unit is touched); and then a charge detection is performed from the first electrode 210 and/or the second electrode 220 to obtain a first charge detecting value and a second charge detecting value. In the embodiment, since the charge is performed from the first electrode 210 and the second electrode 220, the detection may be performed from the first electrode 210, from the second electrode 220 or from the first electrode 210 and the second electrode 220 respectively. It should be noted that in the embodiment, charge from the first electrode 210 and from the second electrode 220 may be performed simultaneously or separately. For example, a same level signal may be applied to the first electrode 210 and the second electrode 220 simultaneously to charge the self capacitor. In other embodiments, the level signals applied to the first electrode 210 and the second electrode 220 may be different; or one level signal may be applied to the first electrode 210 first and then a same or different level signal may be applied to the second electrode 220. Similarly, the detections from the first electrode 210 and the second electrode 220 may be performed simultaneously or separately. In the following embodiments, the charge and the detection may be performed simultaneously or separately, and the discharge and the detection may be performed simultaneously or separately.

2. The first electrode 210 or the second electrode 220 of the induction unit is applied with a level signal twice to charge the self capacitor twice; and after each charge, a charge detection is performed from the first electrode 210 and/or the second electrode 220 to obtain a first charge detecting value and a second charge detecting value. First, the first electrode 210 or the second electrode 220 of the induction unit is applied with a level signal to charge the self capacitor, and then a charge detection is performed from the first electrode 210 and the second electrode 220 respectively to obtain the first charge detecting value and the second charge detecting value. In the embodiment, since the charge is performed from the first electrode 210 or the second electrode 220, the detection needs to be performed from the first electrode 210 and the second electrode 220 respectively. It should be noted that in the embodiment, charge from the first electrode 210 and from the second electrode 220 may be performed simultaneously or separately. In addition, alternatively, charge may be performed from the first electrode 210 twice and detection may be performed from the first electrode 210 twice; or charge may be performed from the second electrode 220 twice and detection may be performed from the second electrode 220 twice. When the charge is performed from one electrode twice, the other electrode is grounded or connected with a large resistor to change the status of the other electrode. For example, when the level signals are applied to the first electrode 210 twice to charge the self capacitor twice, during the first time charge, the second electrode 220 is grounded, and during the second time charge, the second electrode 220 is connected with a large resistor; and when the level signals are applied to the second electrode 220 twice to charge the self capacitor twice, during the first time charge, the first electrode 210 is grounded, and during the second time charge, the first electrode 210 is connected with a large resistor. Thus, even if the charge is performed two times from the first electrode 210, because of a change of a status of the second electrode 220, the detection may be performed two times from the first electrode 210 to obtain the first detecting value and the second detecting value reflecting the ratio between the first resistor R1 and the second resistor R2.

3. The first electrode 210 and the second electrode 220 of the induction unit are applied with level signals to charge the self capacitor; and then the first electrode 210 and/or the second electrode 220 are controlled to be grounded to discharge the self capacitor; and then a discharge detection is performed from the first electrode 210 and/or the second electrode 220 to obtain a first discharge detecting value and a second discharge detecting value. In the embodiment, since the charge of the self capacitor is performed from the first electrode 210 and the second electrode 220, the discharge or detection may be performed from the first electrode 210 and/or the second electrode 220. Specifically, the first electrode 210 and the second electrode 220 may be applied with level signals simultaneously or separately to charge the self capacitor. During the two times discharge, the first electrode 210 may be grounded two times respectively or the second electrode 220 may be grounded two times respectively.

4. The first electrode 210 or the second electrode 220 of the induction unit is applied with a level signal to charge the self capacitor; and then the first electrode 210 and the second electrode 220 are controlled to be grounded to discharge the self capacitor respectively; and then a discharge detection is performed from the first electrode 210 and/or the second electrode 220 to obtain a first discharge detecting value and a second discharge detecting value. In the embodiment, since the discharge of the self capacitor is performed from the first electrode 210 and the second electrode 220, the charge or detection may be performed from the first electrode 210 and/or the second electrode 220. In the embodiment, the charge may be performed from the first electrode 210 two times and the second electrode 220 may be grounded or connected with a large resistor; also, the charge may be performed from the second electrode 220 two times and the first electrode 210 may be grounded or connected with a large resistor.

5. The first electrode 210 or the second electrode 220 of the induction unit is applied with a level signal to charge the self capacitor; and then the first electrode 210 or the second electrode 220 is controlled to be grounded to discharge the self capacitor; and then a discharge detection is performed from the first electrode 210 and the second electrode 220 to obtain a first discharge detecting value and a second discharge detecting value. In the embodiment, since the detection of the self capacitor is performed from the first electrode 210 and the second electrode 220, the charge or discharge may be performed from the first electrode 210 and/or the second electrode 220. In the embodiment, the charge may be performed from the first electrode 210 two times and the second electrode 220 may be grounded or connected with a large resistor; also, the charge may be performed from the second electrode 220 two times and the first electrode 210 may be grounded or connected with a large resistor.

Alternatively, based on the above embodiments, a first detection may be performed when charge the self capacitor to obtain the first charge detecting value and a second detection may be performed when discharge the self capacitor to obtain the second discharge detecting value, and then a ratio between the first resistor R1 and the second resistor R2 may be obtained according to the first charge detecting value and the second discharge detecting value.

The above embodiments show that there may be many variations with respect to the charge and detection. According to an embodiment of the present disclosure, the touch position is determined according to a relation (for example, ratio) between the first resistor R1 and the second resistor R2. Further, the relation between the first resistor R1 and the second resistor R2 is detected by charging and/or discharging the self capacitor. If the induction unit is not touched, no self capacitor will be generated. Therefore, in the embodiments of the present disclosure, subsequent charge/discharge/detection may not be performed, which will not be illustrated in detail here.

It should be noted that the above detecting methods are only some preferable methods according to the embodiments of the present disclosure and those skilled in the art may expand, amend or modify the embodiments without departing from the spirits of the present disclosure.

Figure 4:
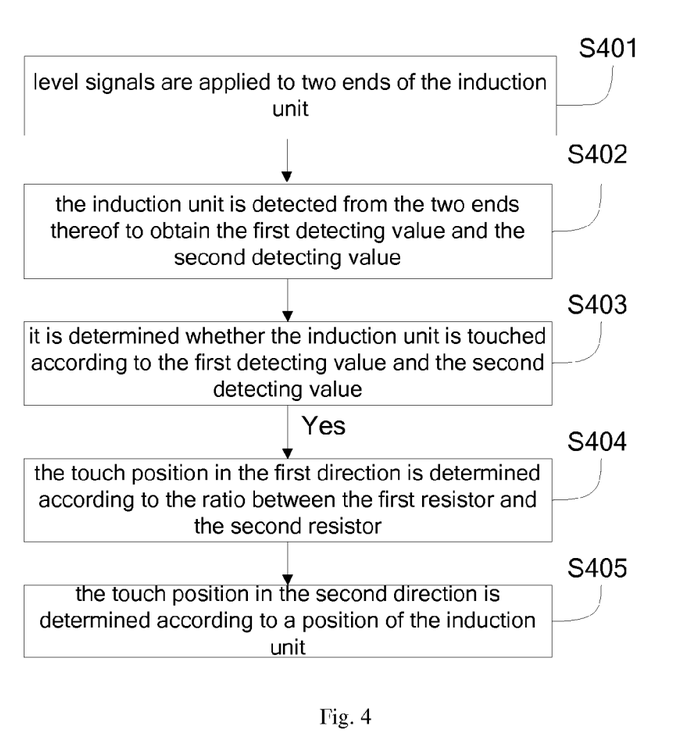
FIG. 4 is a flow chart showing a touch detecting method according to an embodiment of the present disclosure.

FIG. 4 is a flow chart showing a touch detecting method of a touch sensitive device according to an embodiment of the present disclosure. The touch detecting method will be described with reference to the principle view of FIG. 3. The touch detecting method comprises the following steps.

In step S401, level signals are applied to two ends of the induction unit, i.e., level signals are applied to the first electrode 210 and/or the second electrode 220 of the induction unit. In the embodiment, same or different level signals may be applied to the first electrode 210 and the second electrode 220. In other embodiments, the charge may be performed two times from the first electrode 210 or the second electrode 220; or the charge may be performed from the first electrode 210 for the first time and from the second electrode 220 for the second time; or the charge may be performed from the second electrode 220 for the first time and from the first electrode 210 for the second time.

If the induction unit is touched by a finger or other objects at this time, a self capacitor C1 will be generated in the induction unit (referring to FIG. 3). The self capacitor C1 may be charged by the applied level signals. In the embodiments, by charging the self capacitor C1, the detecting precision of the self capacitor C1 may be improved.

It should be noted that if level signals are applied to the two ends of the induction unit simultaneously, two self-capacitance detecting sub-modules are needed to perform detection from the first electrode 210 and the second electrode 220 simultaneously. If the level signals are applied to the two ends of the induction unit separately, only one self-capacitance detecting sub-module is needed.

In one embodiment of the present disclosure, the first detecting value and the second detecting value may be the charge variations $\Delta Q1$ and $\Delta Q2$ of the self capacitor C1 detected from the first electrode 210 and/or the second electrode 220. The charge variation of the self capacitor C1 may be obtained according to $\Delta Q1$ and $\Delta Q2$, and the ratio between R1 and R2 may be obtained. An X coordinate of the touch position may be calculated and finally a position of the self capacitor C1 may be obtained according to a regularly linear relationship of a shape of each induction unit.

In step S402, the induction unit is detected from the two ends thereof to obtain the first detecting value and the second detecting value. In the embodiment, the detection may be performed during the charge or discharge. In the above examples, the first detecting value and the second detecting value are ΔQ1 and ΔQ2 respectively. In the following description, ΔQ1 and ΔQ2 are taken as the first detecting value and the second detecting value. However, other detecting values, such as level signals or currents, which may reflect the relation between the first resistor R1 and the second resistor R2, may also be adopted. In the embodiment of the present disclosure, the detections from the first electrode 210 and from the second electrode 220 may be performed simultaneously or separately.

In one embodiment of the present disclosure, if the detections are performed simultaneously, two self-capacitance detecting sub-modules are needed to detect from the first electrode 210 and the second electrode 220.

In another embodiment of the present disclosure, one self-capacitance detecting sub-module may be used to perform the detection. Referring to step S401, after the self capacitor C1 is fully charged from the first electrode 210, the self-capacitance detecting sub-module detects the self capacitor C1 from the first electrode 210. Then, the self capacitor C1 is charged from the second electrode 220 and the self-capacitance detecting sub-module detects the self capacitor C1 from the second electrode 220.

When the self-capacitance detecting sub-module scans the induction unit, it uses the same phase and level signal, so that for the same self capacitor C1, the charge during the charge is in reverse proportion to its resistance. Assuming the charge variations detected from the first electrode 210 and the second electrode 220 are ΔQ1 and ΔQ2 respectively. In the embodiments of the present disclosure, the self-capacitance detecting sub-module may be any known self-capacitance detecting sub-module in the art. In an embodiment, if two self-capacitance detecting sub-modules are used, they may share many means, so that the overall power consumption of the control chip may not be increased.

In step S403, it is determined whether the induction unit is touched according to the first detecting value and the second detecting value. Specifically, in one embodiment, it may be determined whether the induction unit is touched by judging whether the charge variations ΔQ1 and ΔQ2 are larger than a threshold. Of course, in other embodiments, other judging methods may be used, for example, a method of judging whether the charge variations ΔQ1 and ΔQ2 are smaller than a threshold. If the charge variations ΔQ1 and ΔQ2 are smaller than a threshold, it is determined that the induction unit is touched. Similarly, the threshold may be determined according to a size and type of a touch screen and according to a size of the induction unit.

In step S404, if it is determined that the induction unit is touched, a ratio between a first resistor between the first electrode 210 and the self capacitor and a second resistor between the second electrode 220 and the self capacitor may be calculated. The touch position in the first direction may be determined according to the ratio between the first resistor and the second resistor. In the embodiments, the ratio between the first resistor and the second resistor is calculated according to the ratio between the first detecting value and the second detecting value obtained by detecting from the first electrode 210 and/or the second electrode 220 when the self capacitor is charged/discharged. The coordinates of the self capacitor C1 on the induction unit is ΔQ2/(ΔQ1+ΔQ2).

In step S405, the touch position in the second direction is determined according to a position of the induction unit. Specifically, the touch position in the second direction may be calculated according to the centroid algorithm, which will be briefly discussed below.

In slide bar and touch pad applications, a position of a finger (or other capacitive objects) may be determined according to the induction units touched. A contact area of a finger on the slide bar or touch pad is usually larger than any induction unit. In order to use a center to calculate the touched position, it is effective to scan this array to verify the touch position, and a requirement for the number of adjacent induction units is that the signal is larger than a predetermined touch threshold. After the strongest signal has been found, the strongest signal and those adjacent signals larger than the touch threshold are used to calculate the center.

$$N_{Cent} = \frac{n_{i-1}(i-1) + n_i i + n_{i+1}(i+1)}{n_{i-1} + n_i + n_{i+1}}.$$

$N_{Cent}$ is an identifier of a central induction unit, n is the number of the touched induction units, i is a sequence of the touched induction unit and i is larger than or equal to 2.

For example, when the finger touches the first path, the capacitance change amount of the first path is y1, the capacitance change amount of the second path is y2 and the capacitance change amount of the third path is y3, among which y2 is the largest. Then, the coordinate Y may be calculated as:

$$Y = \frac{y1*1 + y2*2 + y3*3}{y1 + y2 + y3}.$$

Figure 5:
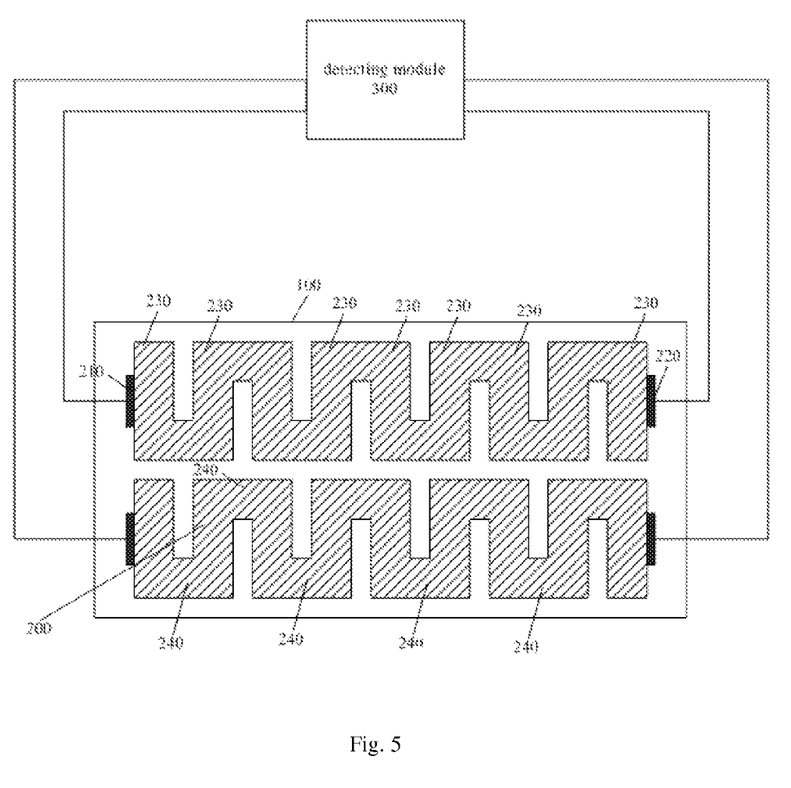
FIG. 5 is a schematic view showing a touch sensitive device according to an embodiment of the present disclosure.

Embodiments according to a first aspect of the present disclosure provide a touch sensitive device according to the above description. The touch sensitive device comprises a substrate and a plurality of induction units. The plurality of induction units are disposed on the substrate and do not intersect with each other. The induction unit has a first electrode and a second electrode disposed opposite to the first electrode. FIG. 5 is a schematic view showing a touch sensitive device according to an embodiment of the present disclosure. The touch sensitive device comprises: a substrate 100, a plurality of induction units 200 disposed on the substrate 100 and do not intersect with each other, and a detecting module 300. As shown in FIG. 5, each induction unit 200 comprises a first electrode 210, a second electrode 220, a plurality of first structures 230, and a plurality of second structures 240. The plurality of second structures 240 may be parallel with each other, or may not be parallel with each other. An angle between each second structure 240 and each first structure 230 is 90 degrees in this embodiment, but is not limited to 90 degrees. As shown in FIG. 5, the plurality of first structures 230 are connected end to end via the plurality of second structures 240, and the first electrode 210 and the second electrode 220 of each induction unit 200 are connected with two first structures 230 at two ends of the each induction unit 200. That is, the first electrode 210 is connected with one first structure 230 at one end of the each induction unit 200, and the second electrode 220 is connected with another first structure 230 at the other end of the each induction unit 200. In terms of an overall structure, the induction unit 200 has a rectangular shape with a large length-to-width ratio. It should be noted that, although each induction unit 200 is disposed along an X axis in FIG. 5, those skilled in the art should understand that each induction unit 200 may be disposed along a Y axis. With the induction unit according to an embodiment of the present disclosure, a noise may be effectively reduced, and a linearity of an induction may be improved. In one embodiment, since each induction unit has a regular snakelike shape, which is substantially connected by a plurality of rectangles, compared with other shapes, a contact part between a finger and the induction unit is more regular in shape and larger in area. For example, for a triangular shape, a slope influence thereof needs to be taken into account, and a contact area is not easy to determine; for a diamond shape, one half of a contact area is used for calculating an X coordinate, and the other half is used for calculating a Y coordinate, that is, only a half of the contact area of the diamond shape is used for calculating each coordinate. In embodiments of the present disclosure, the overall contact area is used for calculating both the X coordinate and the Y coordinate, so that a variation is large enough to be detected easily. Similarly, a variation of an induction capacitance of the contact part is more precise, thus increasing the linearity. In addition, since the conventional diamond or triangular shape uses a single-end wire leading, a structure of which is an antenna structure, the induction unit may attract and emit electromagnetic wave easily to cause interferences with the induction unit itself and with other modules. With the induction unit according to an embodiment of the present disclosure, since a structure itself of a double-end wire leading of the induction unit forms an antenna with a closed loop rather than an open loop, the induction unit may not attract and emit a noise easily, thus reducing an influence of the noise and improving a sensibility.

The detecting module 300 is connected with each first electrode 210 and each second electrode 220 respectively. The detecting module 300 is configured to apply a level signal to the first electrode 210 and/or the second electrode 220 to charge a self capacitor generated by a touch of on an induction unit 200; to calculate a ratio between a first resistor between a first electrode 210 of at least one induction unit 200 and the self capacitor and a second resistor between a second electrode 220 of the at least one induction unit 200 and the self capacitor when a touch on the at least one induction unit 200 is detected by the detecting module 300; to determine a touch position in a first direction according to the ratio between the first resistor and the second resistor; and to determine a touch position in a second direction according to a position of the at least one touched induction unit 200.

In one embodiment, the ratio between the first resistor and the second resistor is calculated by a ratio between a first detecting value and a second detecting value obtained by detecting from the first electrode 210 and/or the second electrode 220 when the self capacitor is charged/discharged In one embodiment, the first detecting value or the second detecting value is one or more values selected from a current detecting value, a self capacitance detecting value, a voltage detecting value, and a charge variation.

In one embodiment, a position of a touch point on a touch screen is determined by the detecting module 300 according to the touch position in the first direction and the touch position in the second direction.

In one embodiment, the first direction is a length direction of each induction unit 200, and the second direction is a direction vertical to each induction unit 200. Specifically, each induction unit 200 is disposed horizontally or vertically. Although in this embodiment, each induction unit 200 is disposed horizontally as shown in FIG. 5, in another embodiment, each induction unit 200 may be disposed vertically.

In one embodiment, the first detecting value comprises a first charge detecting value and a first discharge detecting value, and the second detecting value comprises a second charge detecting value and a second discharge detecting value.

In one embodiment, the detecting module 300 is configured to apply level signals to the first electrode 210 and the second electrode 220 of the at least one touched induction unit 200 to charge the self capacitor, and to perform a charge detection from the first electrode 210 and/or the second electrode 220 of the at least one touched induction unit 200 to obtain the first charge detecting value and the second charge detecting value.

In one embodiment, the detecting module 300 is configured to apply a level signal twice to the first electrode 210 or the second electrode 220 of the at least one touched induction unit 200 to charge the self capacitor twice, and to perform a charge detection from the first electrode 210 and/or the second electrode 220 of the at least one touched induction unit 200 to obtain the first charge detecting value and the second charge detecting value after each charge. When the detecting module 300 applies the level signal twice to the first electrode 210 of the at least one touched induction unit 200 to charge the self capacitor twice, the second electrode 220 of the at least one touched induction unit 200 is grounded for a first time charge, and the second electrode 220 of the at least one touched induction unit 200 is connected with a large resistor for a second time charge. When the detecting module 300 applies the level signal twice to the second electrode 220 of the at least one touched induction unit 200 to charge the self capacitor twice, the first electrode 210 of the at least one touched induction unit 200 is grounded for a first time charge, and the first electrode 210 of the at least one touched induction unit 200 is connected with a large resistor for a second time charge.

In one embodiment, the detecting module 300 is configured to apply level signals to the first electrode 210 and the second electrode 220 of the at least one touched induction unit 200 to charge the self capacitor, to control the first electrode 210 and/or the second electrode 220 of the at least one touched induction unit 200 to be grounded to discharge the self capacitor, and to perform a discharge detection from the first electrode 210 and/or the second electrode 220 of the at least one touched induction unit 200 to obtain the first discharge detecting value and the second discharge detecting value.

In one embodiment, the detecting module 300 is configured to apply a level signal to the first electrode 210 or the second electrode 220 of the at least one touched induction unit 200 to charge the self capacitor, to control the first electrode 210 and the second electrode 220 of the at least one touched induction unit 200 to be grounded respectively to discharge the self capacitor, and to perform a discharge detection from the first electrode 210 and/or the second electrode 220 of the at least one touched induction unit 200 to obtain the first discharge detecting value and the second discharge detecting value.

In one embodiment, the detecting module 300 is configured to apply a level signal to the first electrode 210 or the second electrode 220 of the at least one touched induction unit 200 to charge the self capacitor, to control the first electrode 210 or the second electrode 220 of the at least one touched induction unit 200 to be grounded to discharge the self capacitor, and to perform a discharge detection from the first electrode 210 and the second electrode 220 of the at least one touched induction unit 200 to obtain the first discharge detecting value and the second discharge detecting value.

In one embodiment, the detecting module 300 comprises one or two self-capacitance detecting sub-modules.

According to an embodiment of the present disclosure, an induction unit 200 is provided. The induction unit 200 comprises: a plurality of first structures 230; a plurality of second structures 240 for connecting the plurality of first structures 230 end to end; a first electrode 210 connected with one first structure 230 at one end of the induction unit 200; and a second electrode 220 connected with another first structure 230 at the other end of the induction unit 200, in which the first electrode 210 and the second electrode 220 are connected with corresponding pins of a control chip.

According to an embodiment of the present disclosure, a touch detecting assembly 400 is provided. The touch detecting assembly 400 comprises: a substrate 100; and a plurality of induction units 200 disposed on the substrate 100 and do not intersect with each other, in which the induction unit 200 comprises a first electrode 210, a second electrode 220, a plurality of first structures 230, and a plurality of second structures 240, the plurality of first structures 230 are connected end to end via the plurality of second structures 240, the first electrode 210 is connected with one first structure 230 at one end of the each induction unit 200, the second electrode 220 is connected with another first structure 230 at the other end of the each induction unit 200, and the first electrode 210 and the second electrode 220 are connected with corresponding pins of a control chip.

Figure 6:
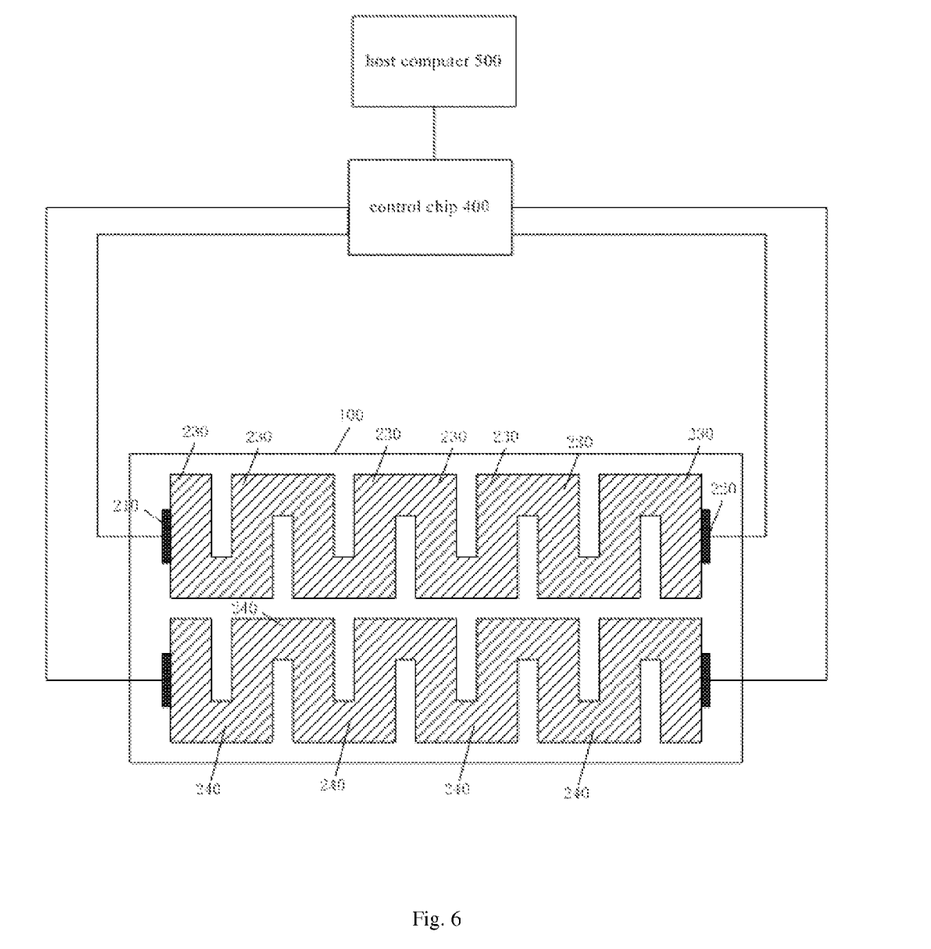
FIG. 6 is a schematic view showing a touch sensitive device according to another embodiment of the present disclosure.

FIG. 6 is a schematic view showing a touch sensitive device according to another embodiment of the present disclosure. The touch sensitive device comprises a touch detecting assembly constituted by the substrate 100 and the plurality of induction units 200 disposed on the substrate 100 and do not intersect with each other, a control chip 400, and a host computer 500 connected with the control chip 400. The first electrodes 210 and the second electrodes 220 of the plurality of induction units 200 are connected with corresponding pins of the control chip 400. The control chip 400 is configured to apply a level signal to each first electrode 210 and/or each second electrode 220 to charge the self capacitor generated by a touch on an induction unit 200, and to calculate a ratio between the first resistor between the first electrode 210 of at least one induction unit 200 and the self capacitor and the second resistor between the second electrode 220 of the at least one induction unit 200 and the self capacitor when a touch on the at least one induction unit 200 is detected by the control chip 400. Similarly, the charge and the detection may be performed simultaneously or separately, and the discharge and the detection may be performed simultaneously or separately, which will not be described in detail here. In addition, the first detecting value or the second detecting value may be one or more values selected from a current detecting value, a self capacitance detecting value, a voltage detecting value, and a charge variation, provided that the detecting values may reflect a difference between the first resistor and the second resistor. In one embodiment, the control chip 400 may comprise two self-capacitance detecting sub-modules to detect the induction unit 200 from the first electrode 210 and the second electrode 220 simultaneously. Since the two self-capacitance detecting sub-modules may share many means, so that the overall power consumption of the control chip 400 may not be increased. In another embodiment, only one self-capacitance detecting sub-module is used to detect the induction unit 200 from the first electrode 210 and the second electrode 220 sequentially. The host computer 500 is configured to receive the ratio between the first resistor and the second resistor sent from the control chip 400, to determine a touch position in a first direction according to the ratio between the first resistor and the second resistor, and to determine a touch position in a second direction according to the position of the at least one touched induction unit 200. In this embodiment, the touch position in the second direction may be calculated according to the centroid algorithm, thus further improving a precision. Therefore, the host computer 500 may determine the touch position on the touch screen according to the touch position in the first direction and the touch position in the second direction.

In one embodiment, the ratio between the first resistor and the second resistor is calculated by a ratio between a first detecting value and a second detecting value obtained by detecting from the first electrode 210 and/or the second electrode 220 of the at least one touched induction unit 200 when the self capacitor is charged or discharged.

In one embodiment, each of the first detecting value and the second detecting value is any one of a current detecting value, a self capacitance detecting value, a voltage detecting value, a charge variation and a combination thereof.

In one embodiment, a position of a touch point on a touch screen is determined by the host computer 500 according to the touch position in the first direction and the touch position in the second direction.

In one embodiment, the first direction is a length direction of each induction unit 200, the second direction is a direction vertical to each induction unit 200, and each induction unit 200 is disposed horizontally or vertically. In some embodiment of the present invention, as shown in FIG. 6, if a finger touches a first part 230, the first direction is a length direction of the first part 230, i.e., a vertical direction of the substrate 100, and the second direction is a direction vertical to the first direction, i.e., a horizontal direction of the substrate 100. If a finger touches a second part 240, the first direction is a width direction of the first part 230, i.e., the horizontal direction of the substrate 100, and the second direction is a direction vertical to the first direction, i.e., the vertical direction of the substrate 100.

In one embodiment, the first detecting value comprises a first charge detecting value and a first discharge detecting value, and the second detecting value comprises a second charge detecting value and a second discharge detecting value.

In one embodiment, the control chip 400 is configured to apply level signals to the first electrode 210 and the second electrode 220 of the at least one touched induction unit 200 to charge the self capacitor, and to perform a charge detection from the first electrode 210 and/or the second electrode 220 of the at least one touched induction unit 200 to obtain the first charge detecting value and the second charge detecting value.

In one embodiment, the control chip 400 is configured to apply a level signal twice to the first electrode 210 or the second electrode 220 of the at least one touched induction unit 200 to charge the self capacitor twice, and to perform a charge detection from the first electrode 210 and/or the second electrode 220 of the at least one touched induction unit 200 to obtain the first charge detecting value and the second charge detecting value after each charge. When the control chip 400 applies the level signal twice to the first electrode 210 of the at least one touched induction unit 200 to charge the self capacitor twice, the second electrode 220 of the at least one touched induction unit 200 is grounded for a first time charge, and the second electrode 220 of the at least one touched induction unit 200 is connected with a large resistor for a second time charge. When the control chip 400 applies the level signal twice to the second electrode 220 of the at least one touched induction unit 200 to charge the self capacitor twice, the first electrode 210 of the at least one touched induction unit 200 is grounded for a first time charge, and the first electrode 210 of the at least one touched induction unit 200 is connected with a large resistor for a second time charge.

In one embodiment, the control chip 400 is configured to apply level signals to the first electrode 210 and the second electrode 220 of the at least one touched induction unit 200 to charge the self capacitor, to control the first electrode 210 and/or the second electrode 220 of the at least one touched induction unit 200 to be grounded to discharge the self capacitor, and to perform a discharge detection from the first electrode 210 and/or the second electrode 220 of the at least one touched induction unit 200 to obtain the first discharge detecting value and the second discharge detecting value.

In one embodiment, the control chip 400 is configured to apply a level signal to the first electrode 210 or the second electrode 220 of the at least one touched induction unit 200 to charge the self capacitor, to control the first electrode 210 and the second electrode 220 of the at least one touched induction unit 200 to be grounded respectively to discharge the self capacitor, and to perform a discharge detection from the first electrode 210 and/or the second electrode 220 of the at least one touched induction unit 200 to obtain the first discharge detecting value and the second discharge detecting value.

In one embodiment, the control chip 400 is configured to apply a level signal to the first electrode 210 or the second electrode 220 of the at least one touched induction unit 200 to charge the self capacitor, to control the first electrode 210 or the second electrode 220 of the at least one touched induction unit 200 to be grounded to discharge the self capacitor, and to perform a discharge detection from the first electrode 210 and the second electrode 220 of the at least one touched induction unit 200 to obtain the first discharge detecting value and the second discharge detecting value.

In one embodiment, the control chip 400 comprises one or two self-capacitance detecting sub-modules.

In summary, according to an embodiment of the present discourse, level signals are applied to electrodes of the induction unit at both ends of the induction unit. A self capacitor may be generated when the induction unit is touched. Therefore, the self capacitor may be charged by the applied level signals and a touch position may be determined according to a ratio between the first resistor and the second resistor. For example, in one embodiment, the ratio between the first resistor and the second resistor is calculated by a ratio between a first detecting value and a second detecting value obtained by detecting from the first electrode and/or the second electrode when the self capacitor is charged/discharged. Therefore, the first detecting value and the second detecting value may be detected from the first electrode and/or the second electrode when the self capacitor is charged or discharged. Thus, the first detecting value and the second detecting value may reflect the touch position on the induction unit, and the touch position on the induction unit may be further determined.

The touch sensitive device according to an embodiment of the present disclosure adopts a novel self capacitor detecting method. When the induction unit is touched, a self capacitor is generated at the touch position on the touch sensitive device, and the touch position may divide the induction unit into two resistors. When the self capacitor detection is performed, the touch position on the induction unit may be determined by taking into account the two resistors.

The touch sensitive device according to an embodiment of the present disclosure is simple in structure. Moreover, for one induction unit, the charge or discharge may be performed from the first electrode and/or the second electrode of the one induction unit, which may not only reduce a RC constant, save time and improve an efficiency, but also ensure that a coordinate may not drift. In addition, with the touch sensitive device according to an embodiment of the present disclosure, the signal-to-noise ratio of a circuit may be effectively increased, the noise of the circuit may be reduced, and a linearity of an induction may be improved. In addition, the touch sensitive device according to an embodiment of the present disclosure may not be influenced by a mutual capacitor and water. Since there is a coupling capacitor between the screen and the induction unit and a level signal Vcom is continuously reversed, which is equivalent to applying a continuously reversed voltage to one end of the coupling capacitor, a voltage at the other end of the coupling capacitor may vibrate violently, thus badly influencing a variation of a capacitor between the induction unit and the ground. When the induction unit is touched, since a current may be generated by the applied voltage in the induction unit, which is equivalent to applying a constant voltage to the other end of the coupling capacitor, even if Vcom is continuously reversed, the voltage at the other end of the coupling capacitor may change slightly. Accordingly, a screen shielding layer and related procedures thereof may be eliminated, thus further reducing a cost while enhancing an anti-interference capability. Furthermore, with the induction unit according to an embodiment of the present disclosure, the noise may be reduced, and the linearity of the induction may be improved.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A touch sensitive device, comprising:
   a touch detecting assembly comprising a substrate and a plurality of induction units disposed on the substrate and not intersecting with each other, wherein the induction unit comprises a first electrode, a second electrode, a plurality of first structures, and a plurality of second structures, the plurality of first structures are connected end to end via the plurality of second structures, the first electrode is connected with one first structure at one end of the induction unit, the second electrode is connected with another first structure at the other end of the induction unit, and each first electrode and each second electrode are connected with corresponding pins of a control chip;

a control chip, wherein the first electrodes and the second electrodes of the plurality of induction units are connected with corresponding pins of the control chip, and the control chip is configured to apply a level signal to each first electrode and/or each second electrode to charge a self capacitor generated by a touch on an induction unit, and to calculate a ratio between a first resistor between a first electrode of at least one induction unit and the self capacitor and a second resistor between a second electrode of the at least one induction unit and the self capacitor when the touch is detected on the at least one induction unit; and a host computer, configured to receive the ratio between the first resistor and the second resistor sent from the control chip, to determine a touch position in a first direction according to the ratio between the first resistor and the second resistor, and to determine a touch position in a second direction according to a position of the at least one touched induction unit.

2. The touch sensitive device according to claim 1, wherein the ratio between the first resistor and the second resistor is calculated by a ratio between a first detecting value and a second detecting value obtained by detecting the first electrode and/or the second electrode of the at least one touched induction unit when the self capacitor is charged/discharged.

3. The touch sensitive device according to claim 2, wherein the first detecting value or the second detecting value is one or more values selected from a current detecting value, a self capacitance detecting value, a voltage detecting value, and a charge variation.

4. The touch sensitive device according to claim 1, wherein a position of a touch point on a touch screen is determined by the host computer according to the touch position in the first direction and the touch position in the second direction.

5. The touch sensitive device according to claim 1 or 4, wherein the first direction is a length direction of each induction unit, the second direction is a direction vertical to each induction unit, and each induction unit is disposed horizontally or vertically.

6. The touch sensitive device according to claim 1, wherein the first detecting value comprises a first charge detecting value and a first discharge detecting value, and the second detecting value comprises a second charge detecting value and a second discharge detecting value.

7. The touch sensitive device according to claim 6, wherein the control chip is configured to apply level signals to the first electrode and the second electrode of the at least one touched induction unit to charge the self capacitor, and to perform a charge detection from the first electrode and/or the second electrode of the at least one touched induction unit to obtain the first charge detecting value and the second charge detecting value.

8. The touch sensitive device according to claim 6, wherein the control chip is configured to apply a level signal twice to the first electrode or the second electrode of the at least one touched induction unit to charge the self capacitor twice, and to perform a charge detection from the first electrode and/or the second electrode of the at least one touched induction unit to obtain the first charge detecting value and the second charge detecting value after each charge.

9. The touch sensitive device according to claim 8, wherein
when the control chip applies the level signal twice to the first electrode of the at least one touched induction unit to charge the self capacitor twice, the second electrode of the at least one touched induction unit is grounded for a first time charge, and the second electrode of the at least one touched induction unit is connected with a large resistor for a second time charge; and
when the control chip applies the level signal twice to the second electrode of the at least one touched induction unit to charge the self capacitor twice, the first electrode of the at least one touched induction unit is grounded for a first time charge, and the first electrode of the at least one touched induction unit is connected with a large resistor for a second time charge.

10. The touch sensitive device according to claim 6, wherein the control chip is configured to apply level signals to the first electrode and the second electrode of the at least one touched induction unit to charge the self capacitor, to control the first electrode and/or the second electrode of the at least one touched induction unit to be grounded to discharge the self capacitor, and to perform a discharge detection from the first electrode and/or the second electrode of the at least one touched induction unit to obtain the first discharge detecting value and the second discharge detecting value.

11. The touch sensitive device according to claim 6, wherein the control chip is configured to apply a level signal to the first electrode or the second electrode of the at least one touched induction unit to charge the self capacitor, to control the first electrode and the second electrode of the at least one touched induction unit to be grounded respectively to discharge the self capacitor, and to perform a discharge detection from the first electrode and/or the second electrode of the at least one touched induction unit to obtain the first discharge detecting value and the second discharge detecting value.

12. The touch sensitive device according to claim 6, wherein the control chip is configured to apply a level signal to the first electrode or the second electrode of the at least one touched induction unit to charge the self capacitor, to control the first electrode or the second electrode of the at least one touched induction unit to be grounded to discharge the self capacitor, and to perform a discharge detection from the first electrode and the second electrode of the at least one touched induction unit to obtain the first discharge detecting value and the second discharge detecting value.

13. The touch sensitive device according to claim 6, wherein the control chip comprises one or two self-capacitance detecting sub-modules.

\* \* \* \* \*